Figure 1A:
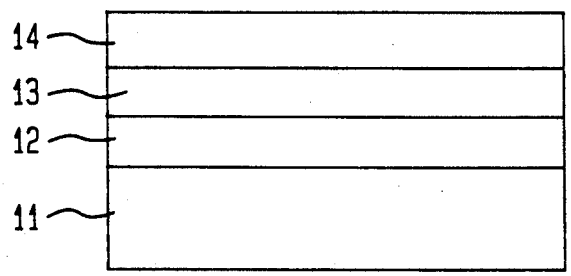

United States Patent [19]

Haas et al.

[11] Patent Number: 5,143,577
[45] Date of Patent: Sep. 1, 1992

[54] SMOOTH-WALL POLYMERIC CHANNEL AND RIB WAVEGUIDES EXHIBITING LOW OPTICAL LOSS

[75] Inventors: David Haas, Springfield; Hyun-Nam Yoon, New Providence; Chia-Chi Teng, Piscataway, all of N.J.

[73] Assignee: Hoechst Celanese Corp., Somerville, N.J.

[21] Appl. No.: 653,332

[22] Filed: Feb. 8, 1991

[51] Int. Cl.$^5$ .................. B44C 1/22; B29C 37/00; C23F 1/00
[52] U.S. Cl. ................................ 156/625; 156/652; 156/655; 156/656; 156/659.1; 156/668; 385/2; 385/132; 385/143; 385/145; 127/162
[58] Field of Search ............... 156/633, 634, 643, 652, 156/655, 656, 659.1, 668; 350/96.1, 96.12, 96.3, 96.34; 427/162

[56] References Cited

U.S. PATENT DOCUMENTS

| | | | |
|---|---|---|---|
| 4,656,636 | 4/1987 | Amann et al. | 156/655 X |
| 4,824,522 | 4/1989 | Baker et al. | 156/643 |
| 4,851,025 | 7/1989 | Siefert et al. | 156/655 X |
| 5,002,361 | 3/1991 | Demartino | 350/96.34 |

FOREIGN PATENT DOCUMENTS 2222465   3/1990   United Kingdom .

Primary Examiner—William A. Powell
Attorney, Agent, or Firm—M. W. Ferrell

[57] ABSTRACT

This invention provides process embodiments for fabricating polymeric channel or rib optical waveguides.

An invention optical waveguide has a channel or rib structure which has a polymer thin film smooth-wall lining on its surfaces to minimize optical loss by scattering of propagating wave energy.

The smooth-wall channel waveguide polymeric medium is in combination with polymeric cladding thin films to form a laminated matrix. The polymers in the waveguiding medium and the lining and cladding thin films of the laminated matrix preferably have side chains which exhibit second order nonlinear optical susceptibility, and which can be molecularly oriented by an electric field.

36 Claims, 1 Drawing Sheet

SMOOTH-WALL POLYMERIC CHANNEL AND RIB WAVEGUIDES EXHIBITING LOW OPTICAL LOSS

CROSS-REFERENCE TO RELATED APPLICATION

The subject matter of this patent application is related to that disclosed in copending patent application Ser. No. 07/655,015, filed Feb. 14, 1991, now U.S. Pat. No. 5,106,211.

BACKGROUND OF THE INVENTION

Optical waveguides consist of a transparent waveguiding core surrounded by transparent materials of lower indices of refraction. Several general methods are utilized for the fabrication of optical waveguides.

In one method optical waveguides are formed by applying a dielectric material to a transparent substrate of lower refractive index.

In another method thermoplastic polymer substrates are embossed with a metal die in the desired waveguide pattern, and subsequently filled or coated with a polymerizable higher index liquid monomer.

In another method optical waveguides are formed by selectively altering the index of refraction of a bulk transparent material. One technique involves ion bombardment in which selected regions of increased refractive index are provided by generating a molecular disorder pattern in a bulk matrix. In another technique selected regions of increased refractive index are either photo-induced in sensitized polymeric materials such as poly(methyl methacrylate) as described in Appl. Phys. Lett., 16, 486 (1970), or electrically induced by diffusing a higher index dopant into a transparent material.

Optical waveguides fabricated in GaAs/AlGa structures by laser-assisted etching has been reported in Integrated and Guided-wave Optics, 1989 Technical Digest Series, 4, 64–67 (Optical Society of America).

Methods of fabricating organic optical waveguides are a newly evolving technology. There are inherent disadvantages in the practice of the various known methods, such as difficult multi-step procedures which do not provide reliable quality control and reproducibility. Typical organic waveguiding media exhibit high optical scattering losses.

Of particular interest with respect to the present invention is UK Patent Application GB 2-222-465-A which was published on Mar. 7, 1990. The patent application describes the fabrication of optical waveguides having a low light loss. The improved waveguides are obtained by the use of a smoothing layer over the rough etched sides of a waveguiding channel.

There is continuing interest in the development of new and improved techniques for the fabrication of organic optical waveguides which overcome some of the inherent deficiencies of optical waveguide formations in transparent organic media.

Accordingly, it is an object of this invention to provide an improved method for the production of organic optical waveguides.

It is another object of this invention to provide a method for the production of polymeric optical waveguides with a two-dimensional channel or rib waveguiding structure.

It is a further object of this invention to provide process embodiments for the production of polymeric optical waveguides having a smooth-wall channel or rib structure which exhibits low optical loss under wave propagating conditions.

Other objects and advantages of the present invention shall become apparent from the accompanying description and Examples.

DESCRIPTION OF THE INVENTION

One or more objects of the present invention are accomplished by the provision of a method for constructing an optical waveguide which comprises:
(a) forming a first thin film cladding of a polymer on a supporting substrate;
(b) etching a channel within and longitudinally across the first cladding thin film;
(c) applying an optically transparent polymer thin film smooth-wall lining to the inner surface dimensions of the etched channel;
(d) filling the channel with a polymer optical waveguiding medium which has a higher refractive index than the first cladding thin film;
(e) applying a second thin film cladding of a polymer which is in contact with the channel polymer waveguiding medium, and which has a lower refractive index than the polymer waveguiding medium;
wherein the polymer waveguiding medium exhibits second order nonlinear optical susceptibility.

The refractive index of the polymer thin film lining preferably is within about 0.005 of the first cladding thin film refractive index, or is the same polymer as the first cladding film.

In another embodiment this invention provides a method for constructing an optical waveguide which comprises:
(a) forming a first thin film cladding of a polymer on a supporting substrate;
(b) forming a polymer optical waveguiding layer in contact with the first thin film;
(c) forming a second thin film cladding of a polymer in contact with the waveguiding layer;
(d) forming a waveguiding rib by etching longitudinal side sections of the cladding thin films and waveguiding layer;
(e) applying an optically transparent polymer thin film smooth-wall lining on the waveguiding rib surfaces; and
(f) applying a third thin film cladding of polymer to encompass the waveguiding rib and form a polymer laminated matrix;
wherein the waveguiding medium and the lining and cladding thin films of the laminated matrix exhibit second order nonlinear optical susceptibility, and the waveguiding medium and the thin film lining have a higher refractive index than the cladding thin films.

The refractive index of the thin film lining preferably is within about 0.005 of the polymer waveguiding medium refractive index.

In a further embodiment this invention provides a method for constructing a rib waveguide electrooptic light modulator which comprises:
(a) forming a first thin film metal electrode on a supporting substrate;
(b) forming a first thin film cladding of a polymer in coextensive proximity with the metal electrode;
(c) forming a nonlinear optical responsive polymer waveguiding layer in contact with the first cladding thin film;

(d) forming a nonlinear optically responsive second thin film cladding of a polymer in contact with the waveguiding layer;

(e) forming a metal masking thin film in coextensive proximity with the second cladding thin film;

(f) forming a waveguiding rib etching longitudinal side sections of the masking thin film, cladding thin film and waveguiding layer;

(g) removing the masking thin film;

(h) applying a nonlinear optically responsive polymer thin film smooth-wall lining on the waveguiding rib surfaces;

(i) applying a nonlinear optically responsive third thin film cladding of a polymer to encompass the lined waveguiding rib;

(j) forming a second thin film metal electrode in coextensive proximity with the waveguiding rib; and (k) applying an electric field by means of the electrodes to the waveguiding rib to induce a noncentrosymmetric molecular orientation in the nonlinear optically responsive waveguiding layer, thin film lining and thin film claddings;

wherein the waveguiding medium and the thin film lining have a higher refractive index than the cladding thin films.

A present invention optical waveguide can function as a linear optical component such as a waveguide device multiplexer or splitter or coupler, or as a nonlinear optical component in a laser frequency converter, an optical Kerr effect device, an electrooptical Kerr effect device, a degenerate four wave mixing device, an optical interferometric waveguide gate, a wide-band electrooptical guided wave analog-to-digital converter, an all-optical multiplexer, an all-optical demultiplexer, an optical bistable device, an optical parametric device, and the like, as elaborated in U.S. Pat. No. 4,775,215.

The polymeric waveguiding medium in the two-dimensional channel waveguiding medium of an invention optical waveguide device is transparent, preferably amorphous in physical properties, and exhibits nonlinear optical response. The channel polymeric waveguiding medium has a higher refractive index (e.g., 1.65) than the surrounding polymeric matrix which interfaces the channel dimensions.

Multiple polymeric thin films in a laminated matrix structure can be applied to the supporting substrate by conventional methods, such as spin coating, spraying, Langmuir-Blodgett deposition, and the like. The thin films typically will have a thickness between about 0.5–10 microns.

A supporting substrate in an invention waveguide can be constructed of any convenient non-conducting medium such as plastic, glass, or silicon.

A present invention two-dimensional channel waveguide structure typically will have dimensions in the range of about 1.5–10 $\mu m \times$ 1.5–10 $\mu m \times$ 0.5–5 cm, and under wave propagating conditions will exhibit an optical loss of less than about 2 dB/cm.

The term "transparent" as employed herein refers to a polymeric thin film medium component which is transparent or light transmitting with respect to the wavelengths of the component's operating system. Under operational conditions such as with a frequency converting waveguide device, the polymeric waveguiding nonlinear optical medium is transparent to both the incident and exit light frequencies.

The term "amorphous" as employed herein refers to a transparent polymeric optical medium which does not have crystalline regions with a preferred short range molecular order and a higher density that can act as optical scattering centers The term "external field" as employed herein refers to an electric or magnetic field which is applied to a substrate of mobile side chain polymer molecules, to induce dipolar alignment of the polymer side chains parallel to the field.

The terms "smooth-wall" as employed herein refers to a channel optical waveguide surface which has a root mean square roughness (sigma) less than about 10 nanometers.

Light in a waveguide scatters off of non-smooth waveguide boundaries. Low loss waveguides require relatively smooth surfaces. The required degree of smoothness can be determined from theoretical dependences of waveguide propagation loss on the boundary roughness. To characterize surface smoothness, both the amplitude of the deviation of the surface and the distance over which this height change occurs need to be specified. If there is a complex surface with height changes of various magnitudes occurring over various spatial distances a complete spectrum of amplitude as a function of spatial extent needs to be determined to completely specify the surface. The simplest definition of wall roughness is the root mean square (rms) of the surface position:

$$\sigma = [\int (x-\bar{x})^2 d_z d_y \div d_z d_y]^{\frac{1}{2}}$$

where x is the height, and z and y are the length coordinates along the surface.

The propagation loss in decibels/centimeter (dB/cm) in a non-smooth planar waveguide is expressed in Appl. Opt., 10, 2395 (1971) as:

$$\text{Loss in dB/cm} = 4.343 \left[ \frac{4\pi n_g}{\lambda} \right]^2 \sigma^2 \left[ \frac{\cos^3(\theta)/\sin(\theta)}{D_{eff}} \right]$$

where $n_g$ is the guiding layer index, $\lambda$ is the wavelength of the light, $\theta$ is the angle that the light in the waveguide makes with the normal to the guiding to cladding layer boundary, and $D_{eff}$ is the effective waveguide width made up of the sum of the actual guiding layer width and the decay lengths of the optical field into the two cladding layers.

The formula has been demonstrated to be applicable to the problem of roughness induced loss in channel and rib waveguides in GaAs/AlGaAs systems, as described in Appl. Phys. Lett., 51(11), 789 (1987) and Appl. Phys. Lett., 53(16), 1483 (1988). The formula is first applied to the top and bottom surfaces and then to the right and left sidewall roughness. The losses from the vertical and horizontal surfaces (in dB/cm) are added to give the total propagation loss.

The etching step utilized in the process embodiments can be a conventional procedures such as plasma etching, excimer laser etching, reactive ion etching, wet chemistry etching, and the like, as described in technical literature such as Journal of Lightwave Technology, 7 (10) 1445 (1989).

An invention organic thin film waveguiding medium consists of a polymeric phase that contains nonlinear optically active and dipolar chromophores. The chromophores can be incorporated as homogeneously dispersed guest molecules in the polymeric phase, or can be covalently bonded to the polymer main chain as pendant side chains.

The organic thin film waveguiding medium can consist of a host polymer such as poly(methyl methacrylate), and a guest organic compound which exhibits nonlinear optical response, such as 4-nitroaniline, 2-methyl-4-nitroaniline, 1-dimethylamino-4-nitronaphthalene, 2-chloro-4-nitroaniline, 4-dimethylamino-4'-nitrostilbene, 13,13-diamino-14,14-dicyanodiphenoquinodimethane and the like. A host polymer can be selected which also exhibit nonlinear optical response.

A present invention optical waveguide laminated matrix preferably has side chain polymers in the channel or rib waveguiding medium and the smooth-wall lining and cladding thin films which are characterized by a recurring monomeric unit corresponding to the formula:

where P' is a polymer main chain unit, S' is a flexible spacer group having a linear chain length of between about 2-20 atoms, M' is a pendant group which exhibits second order nonlinear optical susceptibility, and where the pendant groups comprise at least about 25 weight percent of the polymer, and the polymer has a glass transition temperature or softening point above about 40° C.

Among the preferred types of side chain polymers are those characterized by a recurring monomeric unit corresponding to the formula:

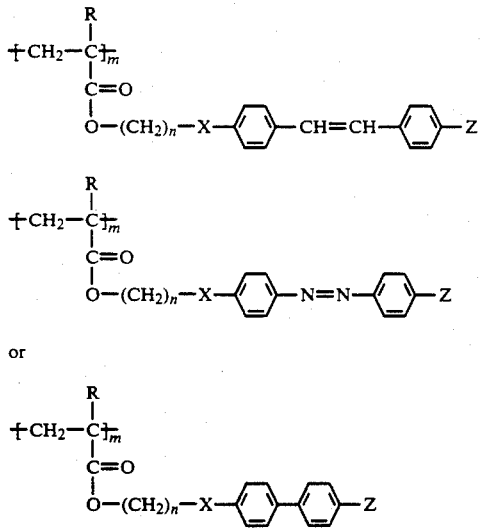

where m is an integer of at least 5; n is an integer between about 2-20; X is $-NR-$, $-O-$ or $-S-$; R is hydrogen or a $C_1-C_4$ alkyl; and Z is $-NO_2$, $-CN$, $-CF_3$, $-CH=C(CN)_2$, $-C(CN)=C(CN)_2$ or $-SO_2CF_3$.

Side chain polymers of interest are described in U.S. Pat. Nos. 4,694,066; 4,762,912; 4,779,961; 4,801,670; and 4,808,332. Illustrative of side chain polymer species are poly[6-(4-nitrobiphenyloxy)hexyl methacrylate], poly(L-N-p-nitrophenyl-2-piperidinemethyl acrylate), and stilbene-containing polymers such as a copolymer of 4-[N-(2-methacroyloxyethyl)-N-methylamino]-4'-nitrostilbene and a $C_1-C_6$ alkyl acrylate or methacrylate:

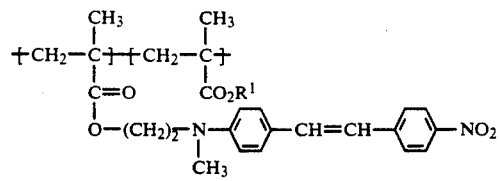

Useful amorphous side chain polymers are described in copending patent application Ser. No. 468,676, filed Jan. 23, 1990, now U.S. Pat. No. 5,002,361.

Poling of a present invention optical waveguide laminated matrix of side chain polymers in the waveguiding medium and the lining and cladding thin films can be accomplished conveniently by heating the matrix near its melting point or glass transition temperature, then applying a DC electric field (e.g., 50–300 V/$\mu$m) to the matrix to align side chain dipoles in a uniaxial orientation. The matrix then is cooled while the matrix is still under the influence of the applied DC electric field. In this manner a stable and permanent molecular orientation is immobilized in a rigid structure within the poled domains.

The poling can be applied to a substrate supported side chain polymer matrix by an appropriate placement of upper and lower electrode units, where one of which may have a grating configuration.

Thin film electrode layers in an optical waveguide laminated matrix typically are composed of a conductive medium such as aluminum, silver or gold. A thin film metal electrode can be applied by electron beam vacuum deposition means, and normally will have a thickness between about 0.1-5 micron. For second harmonic generating waveguide devices, at least one electrode of an electrode set in an optical waveguide matrix has a spatial periodic grating pattern DC electric field poling of the side chain polymer medium in a channel or rib waveguiding medium in the form of a spatial periodic pattern induces a molecular orientation of the polymer side chains parallel to the direction of the electric field. The poling establishes a macroscopic noncentrosymmetry in the poled domains of the polymer medium, and establishes second order nonlinear optical susceptibility in the polymer medium.

FIG. 1 consists of cross-sectional side elevation views illustrating the fabrication of a polymeric rib waveguide in as demonstrated in Example II in accordance with the present invention.

The following examples are further illustrative of the present invention. The optical waveguide device components are presented as being typical, and various modifications in design and operation can be derived in view of the foregoing disclosure within the scope of the invention.

EXAMPLE I

This Example illustrates the fabrication of a polymeric channel waveguide in accordance with the present invention.

A silicon wafer is coated with a 5 micron cladding thin film of a 4-[N-(2-methacroyloxyethyl)-N-methylamino]-4'-nitrostilbene/methyl methacrylate (35/65 molar ratio) copolymer by spinning a 23% by weight solution in cyclohexanone at 2000 rpm for 20 seconds. The copolymer has a $T_g$ of about 133° C. and a weight average molecular weight of about 150,000.

The coated wafer is baked at 150° C. for 4 hours, and then at 130° C. for 1 hour in a nitrogen-purged convection oven.

A thin gold layer (1000 Å) is applied to the coated wafer by electron beam vacuum deposition. AZ-1518 photoresist is spun at 5000 rpm for 30 seconds onto the gold layer, and baked in an oven for 25 minutes at 90° C.

A channel pattern is exposed through a chrome on quartz mask in the AZ-1518 layer using a contact printer (Karl-Suss MJB-3) and 20 mW/cm$^2$ intensity at 405 nm and 20 mw/cm$^2$ at 365 nm for 3 seconds. The exposed regions of the pattern are removed by development using a 1:4 mixture of AZ-400k developer and deionized water. The coated wafer is left in the developer for 20 seconds, and then rinsed in pure deionized water. The channel of removed photoresist is about 5 microns wide. The coated wafer is baked at 110° C. for 25 minutes to fix the pattern.

The pattern is transferred into the gold by chemical etching with a potassium iodide-iodate gold etching solution (J. E. Halma Co.) for eight seconds. The remaining photoresist is flood exposed as above for six seconds and all of the remaining photoresist is developed away in concentrated AZ-400 k developer.

The channel pattern is transferred into the underlying polymeric cladding thin film by plasma etching in an Electrotech brand Plasmafab-340 etcher. The etch conditions are 20 SCCM of oxygen, 190 mtorr total pressure, 15 watts of forward r.f. power, and about 166 Volts effective d.c. bias. The etch rate is approximately 1 micron in 7 minutes, and the channel is etched 1.75 microns deep.

The gold masking layer is removed by dipping the coated wafer in gold etchant for 10 seconds. The formed channel has a bottom roughness of about 5000 Å amplitude, and the channel sidewalls have a roughness of approximately 1000 Å amplitude.

A solution of the copolymeric (35/65 molar ratio) cladding material (10% by weight in cyclohexanone) is spun onto the coated wafer at 2500 rpm to produce a 5000 Å thin film lining. The film lining conforms to the general shape of the channel, and fills and smooths the bottom surface and sidewall roughness. The coated wafer is baked in the manner previously described.

A 2 micron waveguiding layer of the same type copolymer (50/50 molar ratio) is spun from a 20% solution in cyclohexanone at 200 rpm. The 50/50 copolymer has a $T_g$ of about 138° C. and a weight average nonlinear weight of about 45,000. The coated structure is baked in the manner previously described.

A 3 micron thin film of the same copolymeric composition (35/65) as the first cladding thin film is spun into the waveguiding layer, and the resultant laminated matrix is baked in the manner previously described.

If a polymeric channel waveguide is not fabricated in accordance with the present invention, under light wave propagating operational conditions the conventional channel waveguide exhibits an optical loss of greater than about 10 db/cm.

A polymeric channel waveguide fabricated in accordance with the procedures elaborated hereabove exhibits an optical loss of less than about 2 dB/cm under light wave propagating operational conditions. A critical aspect of the waveguiding efficiency of an invention polymeric channel waveguide is the application of a thin film lining to the constructed channel to fill and smooth out the roughness amplitude resulting from an etching cycle.

The thin film smooth-wall lining concept also is applicable to the end-face of a channel waveguiding matrix. Illustrative of this application, polymethyl methacrylate is employed as a supporting substrate for a polymeric channel waveguide of the type described above. A solution of the same polymer as the waveguiding medium is coated on the rough end-face of the waveguide structure. The refractive index-matched smooth-wall end-face surfaces permit efficient coupling of propagating light from a glass fiber or a focusing source into the waveguiding medium.

EXAMPLE II

This Example illustrates the fabrication of an invention polymeric channel waveguide by rib construction as represented in FIG. 1.

A silicon wafer 11 is coated with a 4 micron cladding thin film 12 of a 4-[N-(2-methacroyloxyethyl)-N-methylamino]-4'-nitrostilbene/methyl methacrylate (35/65) copolymer by spinning a 23% by weight solution in cyclohexanone at 3000 rpm for 20 seconds. The copolymer has a $T_g$ of about 133° C. and a weight average molecular weight of about 140,000.

The coated wafer is baked at 160° C. for 4 hours, and then at 130° C. for 1 hour in a nitrogen-purged convection oven.

A 2 micron waveguiding layer 13 of the same type copolymer (50/50 molar ratio) is spun onto cladding thin film 12 from a 20% solution in cyclohexanone at 2000 rpm. The 50/50 copolymer has a $T_g$ of about 138° C. and a weight average molecular weight of about 145,000. The coated structure is baked in the manner previously described.

A 3 micron cladding thin film 14 of the same copolymeric composition (35/65) as cladding thin film 12 is spun onto waveguiding layer 12, and the multiple layer structure is baked in the manner previously described. The structure is shown in FIG. 1a.

A thin gold layer (1000 Å) is deposited on top of cladding thin film 14, then AZ-1518 photoresist is spun at 5000 rpm for 30 seconds onto the gold layer and baked for 25 minutes at 90° C. A rib pattern is exposed through a chrome on quartz mask in the AZ-1518 layer using a contact printer (Karl-Suss MJB-3) and 20 mW/cm$^2$ intensity at 405 nm and 20 mW/cm$^2$ at 365 nm for 3 seconds. The exposed regions of the pattern are developed away using a 1:4 mixture of AZ-400 k developer and deionized water. The remaining photoresist pattern is a 5 micron wide zone of photoresist in the desired waveguide pattern. The structure is baked at 110° C. for 25 minutes to fix the pattern. The waveguide is transferred into the gold layer by chemical etching with a potassium iodide-iodate gold etching solution (J. E. Halma Co.) for 8 seconds. The remaining photoresist is flood exposed as above for 6 seconds and all of the remaining photoresist is developed away in concentrated AZ-400 k developer.

Figure 1B:
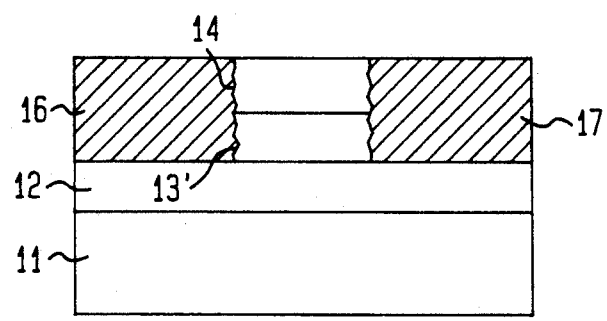

The waveguide pattern is transferred into the underlying copolymeric cladding thin films and waveguiding layer by plasma etching in an Electrotech plasmafab 340 etcher. The etch conditions are 20 SCCM of oxygen, 190 mtorr total pressure, 15 watts of forward r.f. power, and about 166 volts effective d.c. bias. The etch rate is approximately 1 micron in 7 minutes until the standing waveguide ridge is 4 microns deep. The structure is shown in FIG. 1b; where cross-latching 16 and 17 represent the removed volumes, and designation 13' is the polymeric channel waveguiding medium.

Figure 1C:
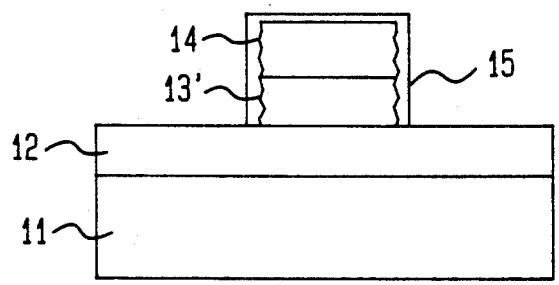

A solution of the waveguiding type copolymer (50/50 molar ratio) (10% by weight in cyclohexanone) is spun onto the wafer at 2500 rpm to produce a 5000 Å film lining 15. Film lining 15 conforms to the general shape of the ridge, and fills and smooths the sidewall roughness. The coated wafer and rib structure as shown in FIG. 1c is baked in the manner previous described.

Figure 1D:
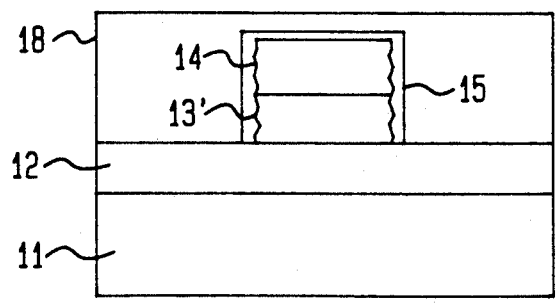

Cladding layer 18 (35/65 molar ratio) is spin-coated at 4000 rpm out of a 23% by weight solution in cyclohexanone as a 3 micron overlay for the ridge structure. The resultant laminated matrix 10 is baked in the manner previously described, except that the 160° C. bake time is reduced to four hours. Laminated matrix 10 is shown in FIG. 1d.

What is claimed is:

1. A method for constructing an optical waveguide which comprises:
    (a) forming a first thin film cladding of a polymer on a supporting substrate;
    (b) etching a channel within and longitudinally across the first cladding thin film;
    (c) applying an optically transparent polymer thin film smooth-wall lining to the inner surface dimension of the etched channel;
    (d) filling the channel with a polymer optical waveguiding medium which has a higher refractive index than the first cladding thin film; and
    (e) applying a second thin film cladding of a polymer which is in contact with the channel polymer waveguiding medium, and which has a lower refractive index than the polymer waveguiding medium;
    wherein the polymer waveguiding medium exhibits second order nonlinear optical susceptibility.

2. A method in accordance with claim 1 wherein the polymer in the waveguiding channel has side chains which have an external field-induced noncentrosymmetric molecular orientation.

3. A method in accordance with claim 1 wherein the refractive index of the thin film lining is within about 0.005 of the first cladding thin film refractive index.

4. A method in accordance with claim 1 wherein the thin film lining is the same polymer as the first cladding thin film.

5. A method in accordance with claim 1 wherein each of the channel surfaces has a roughness (sigma) less than about 10 nanometers.

6. A method in accordance with claim 1 wherein the waveguiding medium has a spatial periodic structure for nonlinear optical coefficient modulation and quasi-phase matching of propagating wave energy, and is adapted for frequency doubling of an incident laser beam.

7. A method in accordance with claim 1 wherein the cladding thin films consist of a homogeneous blend of at least two side chain polymers.

8. A method in accordance with claim 1 wherein each of the polymers in the waveguiding medium and the and cladding thin films is characterized by a recurring monomeric unit corresponding to the formula:

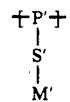

where P' is a polymer main chain unit, S' is a flexible spacer unit having a linear chain length between about 2-20 atoms, M' is a pendant group which exhibits second order nonlinear optical susceptibility, and where the pendant side chains consist of at least 25 percent of the polymers, and the polymer has a glass transition temperature above about 40° C.

9. A method in accordance with claim 8 wherein the M' group in the formula contains a biphenyl structure.

10. A method in accordance with claim 8 wherein the M' group in the formula contains a stilbene structure.

11. A method in accordance with claim 8 wherein the M' group in the formula contains an azobenzene structure.

12. A method in accordance with claim 1 wherein the polymer in the waveguiding medium is characterized by a recurring monomeric unit corresponding to the formula:

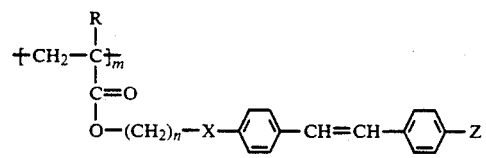

or

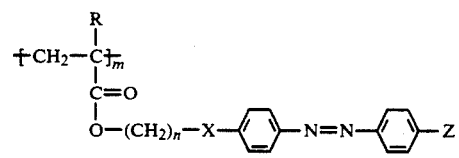

where m is an integer of at least 5; n is an integer between about 2-20; X is —NR—, —O— or —S—; R is hydrogen or a $C_1$-$C_4$ alkyl; and Z is —$NO_2$, —CN, —$CF_3$, —CH=C(CN)$_2$, —C(CN)=C(CN)$_2$ or —$SO_2CF_3$.

13. A method in accordance with claim 1 wherein the side chain polymer in the waveguiding medium is a copolymer of 4-[N-(2-methacroyloxyethyl)-N-methylamino]-4'-nitrostilbene and a $C_1$-$C_6$ alkyl acrylate or methacrylate.

14. A method in accordance with claim 1 wherein the side chain polymer in the waveguiding medium is a copolymer of 4-[N-(2-methacroylethyl)-N-methylamino]-4'-(nitro)azobenzene and a $C_1$-$C_6$ acrylate or methacrylate.

15. A method in accordance with claim 1 wherein the device is adapted to perform with an optical loss in the waveguiding medium of less than about two decibels per centimeter under light wave propagating conditions.

16. A method for constructing an optical waveguide which comprises:
    (a) forming a first thin film cladding of a polymer on a supporting substrate;
    (b) forming a polymer optical waveguiding layer in contact with the first thin film;

(c) forming a second thin film cladding of a polymer in contact with the waveguiding layer;

(d) forming a waveguiding rib by etching longitudinal side sections of the cladding thin films and waveguiding layer;

(e) applying an optically transparent polymer thin film smooth-wall lining on the waveguiding rib surfaces; and (f) applying a third thin film cladding of polymer to encompass the waveguiding rib and form a polymer laminated matrix;

wherein the waveguiding medium and the lining and cladding thin films of the laminated matrix exhibit second order nonlinear optical susceptibility, and the waveguiding medium and the overcoat thin film have a higher refractive index than the cladding thin films.

17. A method in accordance with claim 16 wherein the polymers in the waveguiding medium and the proximate laminated matrix have side chains which have an electric field-induced noncentrosymmetric molecular orientation.

18. A method in accordance with claim 16 wherein the refractive index of the thin film lining is within about 0.005 of the polymer waveguiding medium refractive index.

19. A method in accordance with claim 16 wherein the thin film lining is the same polymer as the waveguiding medium.

20. A method in accordance with claim 16 wherein each of the rib surfaces has a roughness (sigma) less than about 10 nanometers.

21. A method in accordance with claim 16 wherein the waveguiding medium has a spatial periodic structure for nonlinear optical coefficient modulation and quasi-phase matching of propagating wave energy, and is adapted for frequency doubling of an incident laser beam.

22. A method in accordance with claim 16 wherein the cladding thin films consist of a homogeneous blend of at least two side chain polymers.

23. A method in accordance with claim 16 wherein each of the polymers in the waveguiding medium and the overcoat and cladding thin films is characterized by a recurring monomeric unit corresponding to the formula:

where P' is a polymer main chain unit, S' is a flexible spacer unit having a linear chain length between about 2-20 atoms, M' is a pendant group which exhibits second order nonlinear optical susceptibility, and where the pendant side chains consist of at least 25 percent of the polymers, and the polymer has a glass transition temperature above about 40° C.

24. A method in accordance with claim 23 wherein the M' group in the formula contains a biphenyl structure.

25. A method in accordance with claim 23 wherein the M' group in the formula contains a stilbene structure.

26. A method in accordance with claim 23 wherein the M' group in the formula contains an azobenzene structure.

27. A method in accordance with claim 16 wherein the polymer in the waveguiding medium is characterized by a recurring monomeric unit corresponding to the formula:

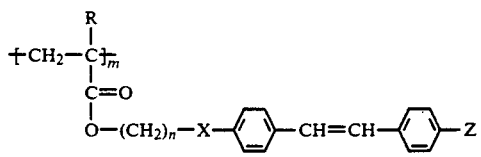

or

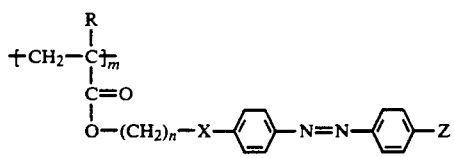

where m is an integer of at least 5; n is an integer between about 2-20; X is —NR—, —O— or —S—; R is hydrogen or a $C_1$-$C_4$ alkyl; and Z is —$NO_2$, —CN, —$CF_3$, —CH=C(CN)$_2$, —C(CN)=C(CN)$_2$ or —$SO_2CF_3$.

28. A method in accordance with claim 16 wherein the side chain polymer in the waveguiding medium is a copolymer of 4-[N-(2-methacroyloxyethyl)-N-methylamino]-4'-nitrostilbene and a $C_1$-$C_6$ alkyl acrylate or methacrylate.

29. A method in accordance with claim 16 wherein the side chain polymer in the waveguiding medium is a copolymer of 4-[N-(2-methacroylethyl)-N-methylamino]-4'-(nitro)azobenzene and a $C_1$-$C_6$ alkyl acrylate or methacrylate.

30. A method in accordance with claim 16 wherein the device is adapted to perform with an optical loss in the waveguiding medium of less than about two decibels per centimeter under light wave propagating conditions.

31. A method for constructing a rib waveguide electrooptic light modulator which comprises:

(a) forming a first thin film metal electrode on a supporting substrate;

(b) forming a first thin film cladding of a polymer in coextensive proximity with the metal electrode;

(c) forming a nonlinear optical responsive polymer waveguiding layer in contact with the first cladding thin film;

(d) forming a nonlinear optically responsive second thin film cladding of a polymer in contact with the waveguiding layer;

(e) forming a metal masking thin film in coextensive proximity with the second cladding thin film;

(f) forming a waveguiding rib by etching longitudinal side sections of the masking thin film, cladding thin film, and waveguiding layer;

(g) removing the masking thin film;

(h) applying a nonlinear optically responsive polymer thin film smooth-wall lining on the waveguiding rib surfaces;

(i) applying a nonlinear optically responsive third thin film cladding of a polymer to encompass the lined waveguiding rib;

(j) forming a second thin film metal electrode in coextensive proximity with the waveguiding rib; and (k) applying an electric field by means of the two electrodes to the waveguiding rib to induce a non-centrosymmetric molecular orientation in the nonlinear optically responsive waveguiding layer, film lining and thin film claddings;

wherein the waveguiding layer and the thin film lining have a higher refractive index than the cladding thin films.

32. A method in accordance with claim 31 wherein the refractive index of the thin film lining is within about 0.005 of the polymer waveguiding medium.

33. A method in accordance with claim 31 wherein the thin film lining is the same polymer as the waveguiding medium.

34. A method in accordance with claim 31 wherein each of the rib surfaces has a roughness (sigma) less than about 10 nanometers.

35. A method in accordance with claim 31 wherein at least one of the electrodes has a spatial grating pattern.

36. A method for improving the light coupling efficiency of a polymeric channel or rib waveguide which comprises coating the rough end-face of the waveguide with a polymer to form a smooth-wall film which is refractive index-matched with the polymer waveguiding medium.

* * * * *